US012565282B2

(12) United States Patent \
Loper et al.

(10) Patent No.: US 12,565,282 B2 \
(45) Date of Patent: Mar. 3, 2026

(54) PEDAL WITH ADJUSTMENT DIAL SYSTEM

(71) Applicant: KOM CYCLING LLC, Grand Rapids, MI (US)

(72) Inventors: Austin Loper, Grand Rapids, MI (US); Jonathan Roobol, Howell, MI (US)

(73) Assignee: KOM CYCLING LLC, Grand Rapids, MI (US)

( * ) Notice: Subject to any disclaimer, the term of this patent is extended or adjusted under 35 U.S.C. 154(b) by 0 days.

(21) Appl. No.: 18/566,552

(22) PCT Filed: Jun. 2, 2022

(86) PCT No.: PCT/US2022/031955

§ 371 (c)(1), \
(2) Date: Dec. 1, 2023

(87) PCT Pub. No.: WO2022/256523

PCT Pub. Date: Dec. 8, 2022

(65) Prior Publication Data

US 2024/0253731 A1 Aug. 1, 2024

Related U.S. Application Data

(60) Provisional application No. 63/195,804, filed on Jun. 2, 2021.

(51) Int. Cl. \
B62M 3/08 (2006.01)

(52) U.S. Cl. \
CPC .................................. B62M 3/083 (2013.01)

(58) Field of Classification Search \
CPC ...................................................... B62M 3/083 \
See application file for complete search history.

(56) References Cited

U.S. PATENT DOCUMENTS

| | | | |
|---|---|---|---|
| 4,200,005 | A | 4/1980 | Mohr |
| 4,386,472 | A | 6/1983 | Shimano |
| 4,638,685 | A | 1/1987 | Cigolini |
| 4,665,767 | A | 5/1987 | Lassche |
| 4,856,211 | A | 8/1989 | Phillips |
| 4,870,873 | A | 10/1989 | Tackles |
| 4,953,425 | A | 9/1990 | Barefoot |

(Continued)

FOREIGN PATENT DOCUMENTS

| | | | | | |
|---|---|---|---|---|---|
| JP | 2016504108 | A | * | 2/2016 | ........... A43C 11/165 |
| JP | 6554469 | B2 | * | 7/2019 | ............. A43C 11/16 |

(Continued)

OTHER PUBLICATIONS

Translation of KR-102331089-B1, Nov. 24, 2021 (Year: 2021).*

(Continued)

*Primary Examiner* — Jacob S. Scott \
(74) *Attorney, Agent, or Firm* — Brooks Kushman P.C.

(57) ABSTRACT

According to at least one embodiment, a pedal system is provided for adjustably securing a rider's foot to a pedal without a cleat. At least one strap is connected to a pedal body. A ratchet dial is secured to the strap. A cord extends from the ratchet dial to form a loop, wherein the loop cooperates with a guide feature on the pedal body or a strap. Rotation of the ratchet dial varies a length of the cord, and thereby adjusts a strap opening formed with the pedal body.

19 Claims, 7 Drawing Sheets

(56)            References Cited

U.S. PATENT DOCUMENTS

| | | | |
|---|---|---|---|
| 5,737,977 | A | 4/1998 | Surdi et al. |
| 6,393,941 | B1 | 5/2002 | Liu |
| 2002/0189395 | A1 | 12/2002 | Vito |
| 2004/0007090 | A1 | 1/2004 | Liou |
| 2012/0137826 | A1 | 6/2012 | Lin |
| 2013/0012570 | A1 | 1/2013 | Gollob et al. |
| 2019/0054977 | A1 * | 2/2019 | Golesh et al. |
| 2023/0339569 | A1 * | 10/2023 | Cuomo ................. B62M 3/083 |

FOREIGN PATENT DOCUMENTS

| | | | | |
|---|---|---|---|---|
| KR | 1020160122384 | A | 10/2016 | |
| KR | 102056134 | B1 | 12/2019 | |
| KR | 1020200088922 | A | 7/2020 | |
| KR | 102331089 | B1 * | 11/2021 | ......... B65H 75/4492 |

OTHER PUBLICATIONS

Translation of JP-2016504108-A, Feb. 12, 2016 (Year: 2016).*
Translation of JP-6554469-B2, Jul. 31, 2019 (Year: 2019).*
Define rachet dial, Microsoft Bing, Nov. 7, 2024 (Year: 2024).*
Define ratchet, Microsoft Bing, Nov. 7, 2024 (Year: 2024).*
International Search Report and Written Opinion for Application No. PCT/US2022/031955, dated Sep. 15, 2022, 11 Pages.

\* cited by examiner

PEDAL WITH ADJUSTMENT DIAL SYSTEM

CROSS-REFERENCE TO RELATED APPLICATIONS

This application is the U.S. national phase of PCT Application No. PCT/US2022/031955 filed Jun. 2, 2022, which claims the benefit of U.S. provisional application Ser. No. 63/195,804 filed Jun. 2, 2021, the disclosures of which are hereby incorporated in their entirety by reference herein.

TECHNICAL FIELD

The present application relates to bicycle pedals, in particular clipless pedals for use with conventional shoes.

BACKGROUND

Cycling enthusiasts commonly use a cycling specific shoe with a cleat on the underside to attach their foot to a latching mechanism on the bicycle pedal. This allows the user to apply force to the pedal throughout the full circle of the pedal stroke. When using a shoe with a platform cycling pedal, the user is limited to only applying force in the downward vertical, or near vertical, direction in the pedal stroke. Adding a strapping mechanism to a platform pedal allows a recreational cyclist to wear a regular shoe and securely attach their foot to the pedal to gain the associated benefits.

Some examples of prior pedals with clips include US2019/0054977 for Pedal with Detachable Shoe Platform and Adjustable Toe Clip; U.S. Pat. No. 4,953,425 for a Bicycle Pedal Attachment; U.S. Pat. No. 5,737,977 for a Selectively Releasable Toe Clip; US2004/0007090 for a Securing Device for Securing a Toe Strap on Pedal; U.S. Pat. No. 4,665,767 for a Bicycle Pedal with Foot Holder; US2012/0137826 for a Supplementary Device for Bicycle Pedal and Bicycle Pedal; U.S. Pat. No. 4,638,685 for an Orthopedic Safety Strap Suitable for Bicycle Pedals; U.S. Pat. No. 4,870,873 for a Bicycle Toe Clip; U.S. Pat. No. 4,856,211 for a Bicycle Pedal Foot Holder; U.S. Pat. No. 4,200,005 for a Pedal having an Improved Foot-Retaining Strap Means; U.S. Pat. No. 6,393,941 for a Toe Strap Receiving Device for a Pedal; and U.S. Pat. No. 4,386,472 for Fixing Band for Shoes.

SUMMARY

According to at least one embodiment, a pedal system is provided and includes a rigid pedal body being generally rectangular and having a generally planar support surface. At least one flexible strap is connected to the pedal body. An adjustment dial is secured to at least one of the strap or pedal body. A cord extends from the adjustment dial and cooperates with a guide feature on the pedal body or the flexible strap. A shoe opening is defined between the support surface of the pedal body, the strap and the cord. Rotation of the adjustment dial varies a length of the cord, and thereby adjusts a size of the shoe opening formed between the pedal body and the strap and for adjustably securing a rider's foot to the pedal body.

In another embodiment, the strap is secured to the pedal body on a first side and the cord is attached to the pedal body on a second side. The pedal body has a guide hook on the second side and the cord is attached guide hooks.

In another embodiment, the strap includes a forward strap segment and an aft strap segment, where the cord extends through guides on the forward and aft strap and the cord is attached to the pedal body at a forward hook and an aft guide hook.

In another embodiment, the strap has a length generally equal to the length of the pedal body.

In another embodiment, the strap is formed of a flexible material preformed with a curvature to form the adjustable shoe opening.

In another embodiment, the pedal body has two guide hooks on the second side. The strap has at least one guide hook, where the cord is attached to the guide hooks.

In another embodiment, a first strap is secured to a first side of the pedal body and a second strap is secured to the second side of the pedal body. The cord is attached to and extends between the first and second straps. The adjustment dial is attached to one of the first and second straps.

In another embodiment, the pedal system may include a third strap secured to the first side of the pedal body, and a fourth strap is secured to the second side of the pedal body. A second cord extends between the third and fourth straps; and a second adjustment dial is attached to the third and fourth straps.

In another embodiment, the adjustment dial may include a ratchet dial.

In another embodiment, the first and second straps are formed of a flexible material preformed with a curvature to form the adjustable shoe opening.

In another embodiment, the cord is attached to the pedal body on a first side and a second side. The strap is attached to the cord and defines a pressure plate between the first and second sides of the pedal body.

In another embodiment, the at least one strap is fixed to the rigid pedal body at a first end and the cord extends from a second end of the strap and is connected to a guide feature.

In another embodiment, the ratchet dial rotates to reel the cord into the ratchet dial in one way and prevents the cord from reeling out of the dial until a release mechanism in the dial is actuated.

According to at least one embodiment, a pedal system is provided for adjustably securing a rider's foot to a pedal without a cleat. At least one strap is connected to a pedal body. A ratchet dial is secured to the strap. A cord extends from the ratchet dial to form a loop, wherein the loop cooperates with a guide feature on the pedal body or a strap. Rotation of the ratchet dial varies a length of the cord, and thereby adjusts a strap opening formed with the pedal body.

According to at least one embodiment, the pedal system also includes a rigid pedal body having a generally planar support surface for supporting a rider's foot. A dial-adjustment system has at least one strap attached to the pedal body at a first end. A ratchet dial is secured to the strap. A cord is connected to the ratchet dial to form a loop. The cord extends from a second free end of the strap and cooperates with a guide feature on the pedal body or a strap. A variable opening is defined between the support surface of the pedal body, the strap and the cord. Rotation of the ratchet dial varies a length of the cord, and thereby adjusts a size of the opening for adjustably securing the rider's foot to the pedal body.

DETAILED DESCRIPTION

Figure 1:
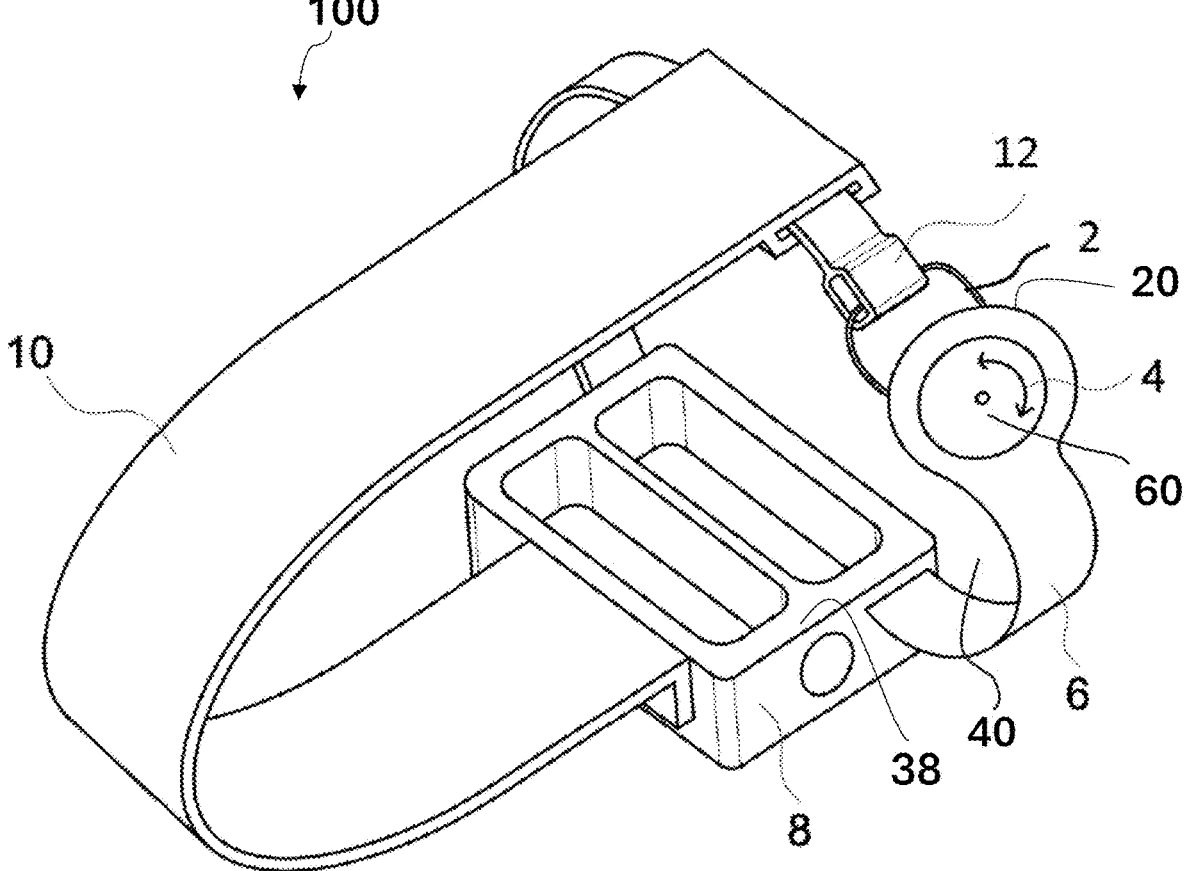
FIG. 1 is a pedal with an adjustment dial system according to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Typical pedal designs that use a plastic or metal cage tightened with a strap and buckle leave a loose length of strap when they are tightened that must be fed back through another part of the buckle as a secondary operation after tightening. If left loose, this strap can catch on other parts of the bicycle or in the environment and cause a hazard. The buckle on typical pedal straps is also covered by the extra length of strap and locating the buckle to loosen can be difficult and take longer than desired. The other disadvantage of the cage with strap design is discomfort. The strap is narrow and applies pressure over a very localized area over the top of the foot, and the edge of the cage presses into the top of the foot when properly tightened.

Other designs that consist of a single strap over the top of the user's shoe only provide retention in a single area of the shoe and result in less secure shoe retention. Velcro closure systems leave an extra length of strapping loose after securing similar buckle systems. Straps secured by holes in the strap and pins on the sides of the pedal often require dismounting the bicycle and using both hands to adjust the strap and cannot be adjusted while engaged in activity.

Cycling-specific shoes provide uniform and adjustable retention of the user's foot in the shoe. However, cycling-specific shoes must be used with specific pedal and cleat combinations. Cycling shoes are also typically difficult to wear for day-to-day activities due to a rigid sole.

Some cycling platform pedals exist with a plastic or metal cage and a woven strap with metal buckle, or platform pedals with a single strap over the top of the user's foot and attached to the platform on both sides, such as the self-tightening cage in U.S. Pat. No. 6,510,764. Most of the prior art pedals involve a buckle and clip mechanism, sometimes in conjunction with incremental latching features on the straps. Recently, bike pedal designs have moved towards a clipless trend, and those pedals do not include a toe clip fastening feature.

There are several advantages of using an adjustment dial pedal system of the present application over these prior designs. The tightening operation may be performed with one hand and may be done while sitting on the bike with feet on the pedals. The cord system is completely self-contained and does not have any loose or excess straps remaining after tightening. The adjustment dial allows for micro-adjustment of tension that allows the user to easily adjust the pedal system for comfort or security.

FIGS. 1-7 illustrate pedal systems with adjustment dials and strap systems for use with platform bicycle pedals. Using a strap with a platform pedal allows a recreational cyclist to securely attach their foot to the pedal while wearing a regular shoe and gaining performance benefits of cycling-specific shoes with cleats. Incorporating an adjustment dial system with the strap is a new method that provides a lightweight, completely self-contained, and easily adjusted strap. The dial cords can be minutely adjusted to a comfortable tension, and easily released to allow the shoe to be freed.

Typical adjustment dial devices are incorporated in footwear that is already sized to correspond with the specific shoe or boot. One of the challenges of incorporating an adjustment dial with a pedal is that pedal systems should be adjustable to fit a large range of shoes including both large and small shoes. Most pedal cages do not properly fit shoes at the ends of the spectrum. For example, typical cages do not open large enough to allow large shoes to slide far enough in, so the rider's foot is not properly supported on the ball of the rider's foot. At the other end of the spectrum, typical cages can not be adequately tightened to small shoes when the shoes are properly aligned on the ball of the rider's foot.

The adjustment dial system 20 can also be easily expanded to allow multiple users with many different sized shoes to share the same exercise equipment and easily adjust the pedal retention tightness with a single hand while operating the equipment.

FIG. 1 illustrates a pedal system 100 according to one example. As shown, the system 100 uses a dial-tensioned system to retain a shoe on a bicycle platform pedal body 8. The adjustment dial system 20 has a strap 6, a thin cord 2 and an adjustment dial 4 to adjust an opening 40 for the rider's foot.

The platform pedal body 8 is generally rectangular and has a generally planar support surface 38 to support the rider's foot. The support surface 38 may have grip features or cut outs and still be considered to have a generally flat or planar support surface. The rider's shoe is placed on the support surface 38 and within an adjustable opening 40 formed by the cord 2, strap 6 and support surface 38. Then the adjustment dial 4 is turned to reduce the length of the cord 2 and tighten or constrict the strap 6 against the rider's shoe.

The cord 2 may be low profile and completely contained within the adjustment dial 4 and corresponding straps 6. When the adjustment dial system 20 is tightened, the additional length of cord 2 is coiled up within the dial 4 instead of hanging loose. To release the tension on the adjustment dial system 20, the user can manipulate an unlocking or release mechanism 60 on the adjustment dial 4. The dial 4 is always exposed and in the same location relative to the pedal 8 to allow the user to easily adjust the dial 4. Different styles of adjustment dials 4 may use different methods to release tension and may include, but not limited to: rotating dial in the opposite direction as when tightening, pulling up on the dial, or pulling on a lever attached to the face of the dial.

The adjustment dial system 20 can be used in several configurations with the pedal body 8. One example, shown in FIG. 1, uses the dial-tensioned system 20 and has a strap 6 near the aft edge of a pedal body 8 to wrap around the middle of the shoe and has a plastic or metal cage 10 that may compress against the top of the user's shoe.

As shown in FIGS. 1-7, the adjustment dial 4 may have a static base and a dial that is allowed to rotate relative to it. The interface between the base and dial has a ratcheting mechanism built into it to allow rotation in one direction and resist rotation in the opposite direction to reel in the cord and prevent it from pulling loose. The dial may interface with the cord on either one or both ends of the cord, and hence can reel in the cord from a single end or both ends simultaneously. A mechanism also exists in the ratchet cord system to allow the tension on the dial to be released and allow the cord to be unrolled from the dial. The base can be directly manufactured into a surface of the hardware by methods such as molding or machining or may be created as a separate detail that is sewn to a flexible strap.

As shown in FIGS. 1-7, the cord may be routed from the dial, through a guide that may be eyelet or hook shaped on the strap or pedal, and then back to the dial. When the cord is reeled in, it is reeled from both sides of the cord simultaneously, but due to the geometry of the dial it may not be evenly taken up into the dial the same amount on both ends. Hence, the cord is allowed to slide through the guide as the cord is tightened. The length of cord that the dial can take up as it is tightened can vary based on the type of dial used. In one example, the dial that can take up 7-10 inches of cord into the dial. Other suitable lengths of cord may be used.

The adjustment dial 4 may be a ratchet dial or dial-tensioning device that allows incremental ratcheting rotational adjustment of the cord or other cable or tension element. The cord can be wound and unwound by the ratchet-dial to allow adjustment of a loop of the cord. The ratchet-dial can control rotation control and lock the dial so the dial maintain tension and prevent the cord from being unwound or loosened. For example, the ratchet-dial may include ratchet gears with teeth and pawls to interact with the ratchet gear and provide one-way winding and torque control. The adjustment dial 4 may also include other one-way mechanisms such as roller bearings, clutches, as well as other mechanisms.

The cord 2 may be made of high strength polymer, braided metal or braided metal coated with polymer. In one example, the cord has a cross-section between 0.5 mm and 1.5 mm in diameter. Other cord materials, cables or tension elements having other dimensions may also be used.

The strap 6 may be made from a flexible material that is able to carry a moderate tensile load from end to end. Typical materials used to make straps include woven fabric, woven webbing, leather, foam and plastic, or a combination of these and other materials.

The pedal body 8 is the platform and surface that the rider's shoe rests on and may be made of plastic or metal or any suitable material with rigidity and stiffness for the rider to apply pedal force. The pedal body 8 may have a pedal platform adapter that can snap into a spring-loaded "clip" on the face of the pedal that is used with a cycling specific shoe with cleats. The pedal body 8 may have a cleat-feature on one side that cooperates with the clip. The clip and corresponding cleat-feature may be different styles such as Look Keo, Look Delta, Shimano SPD, Shimano SPD-SL, Crankbrothers Eggbeater, Time ATAC, Wahoo Speedplay and/or other style/brand of clip and cleat-features. On the opposite side from the cleat-feature, the pedal body 8 may be a large, generally flat platform surface for the user to place their non-cycling specific shoe.

The adjustment dial and guides may be made of metal or plastic, or a combination thereof. Guides 12 may be shaped as eyelets, hooks or channels that allow the cord to slide through during tightening.

In the pedal system 100 in FIG. 1, the adjustment dial 4 replaces a traditional toe-cage webbing and metal buckle strap. An adjustment dial system is sewn into the strap 6 that can be routed through the pedal body 8 and through the toe cage features 10. The end of the strap opposite the adjustment dial contains a guide 12. The cord 2 is routed from the dial 4, through the guide 12 and back to the dial 4 to form a continuous loop between the dial 4 and the guide 12. The combination of the strap 6 with the routed cord form a continuous loop through the pedal body 8 and toe cage 10. When the adjustment dial is turned, the cord 2 is reeled into the dial body to tighten the strap 6.

Figure 2:
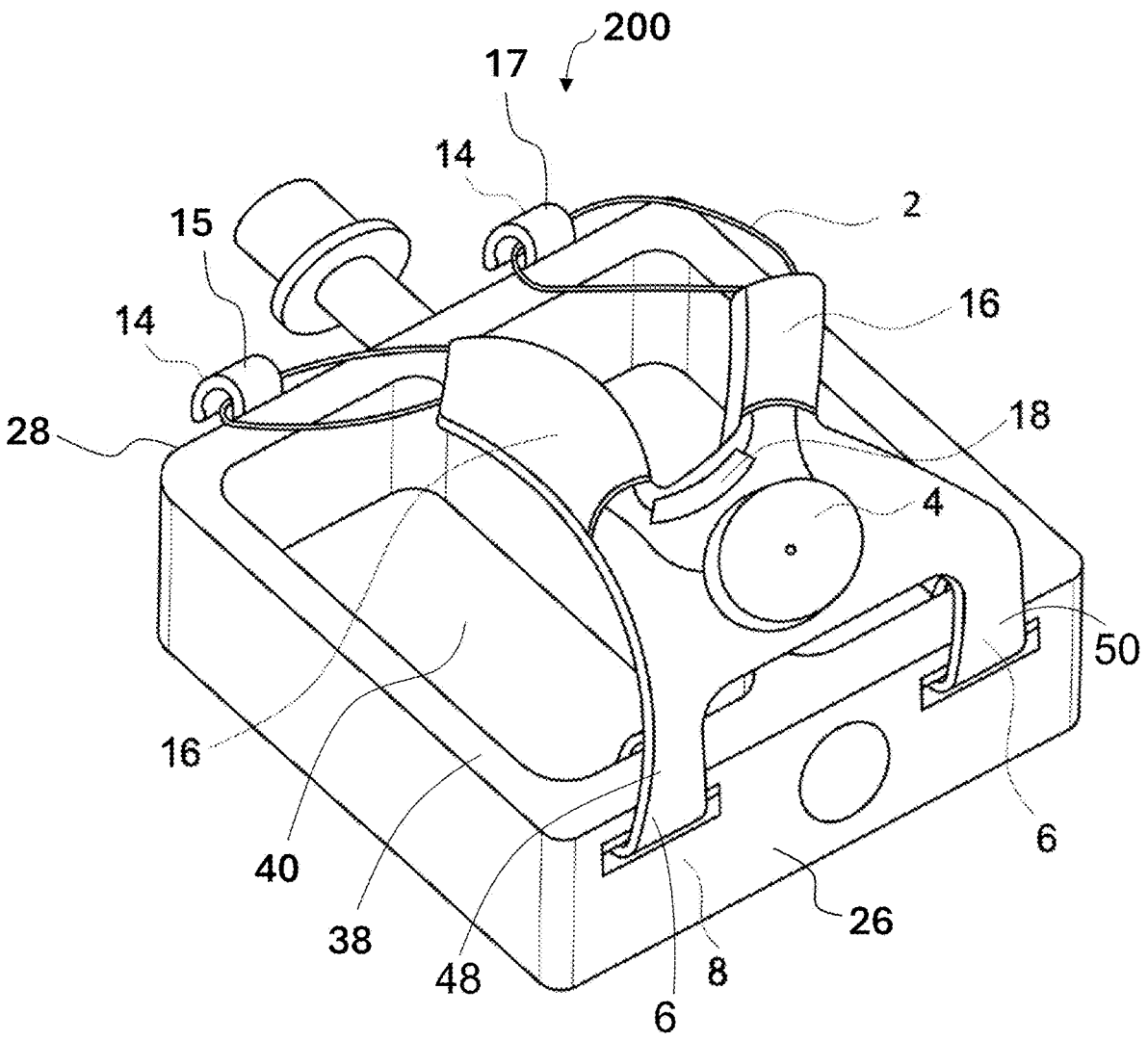
FIG. 2 is a pedal with an adjustment dial system according to another embodiment.

In another embodiment shown in FIG. 2, a pedal system 200 uses a single adjustment dial 4 with a cord 2 routed back and forth over the top of the user's shoe and attached to the platform pedal body 8 on both sides of the shoe. By tightening the single dial 4, the entire cord 2 is shortened and tightened evenly around the shoe.

In the pedal system 200 in FIG. 2, the adjustment dial system 20 tightens two straps 6 with a single dial 4. The adjustment dial system is sewn into a strap 6 that is attached to the first side 26 of the pedal body 8 and has features to route the cord 2 over the user's foot to the second side 28 of the pedal. The cord 2 is routed from the adjustment dial 4 over the foot and through a forward hook 15 on the opposite side of the pedal 8, then back over the foot and through another guide feature 18 near the adjustment dial 4, over the foot and through an aft hook 17 on the opposite side of the pedal 8 and finally routed back to the adjustment dial 4. Similarly, the cord 2 may be routed from the dial 4 through guides 16 attached to straps 6 that are attached to the second side 28 of the pedal body 8 and the straps 6 pass over the top of the foot. When the adjustment dial 4 is turned, the cord is reeled into the dial body 4 and the cord 2 is tightened uniformly on both the forward strap 48 and aft strap 50.

Figure 3:
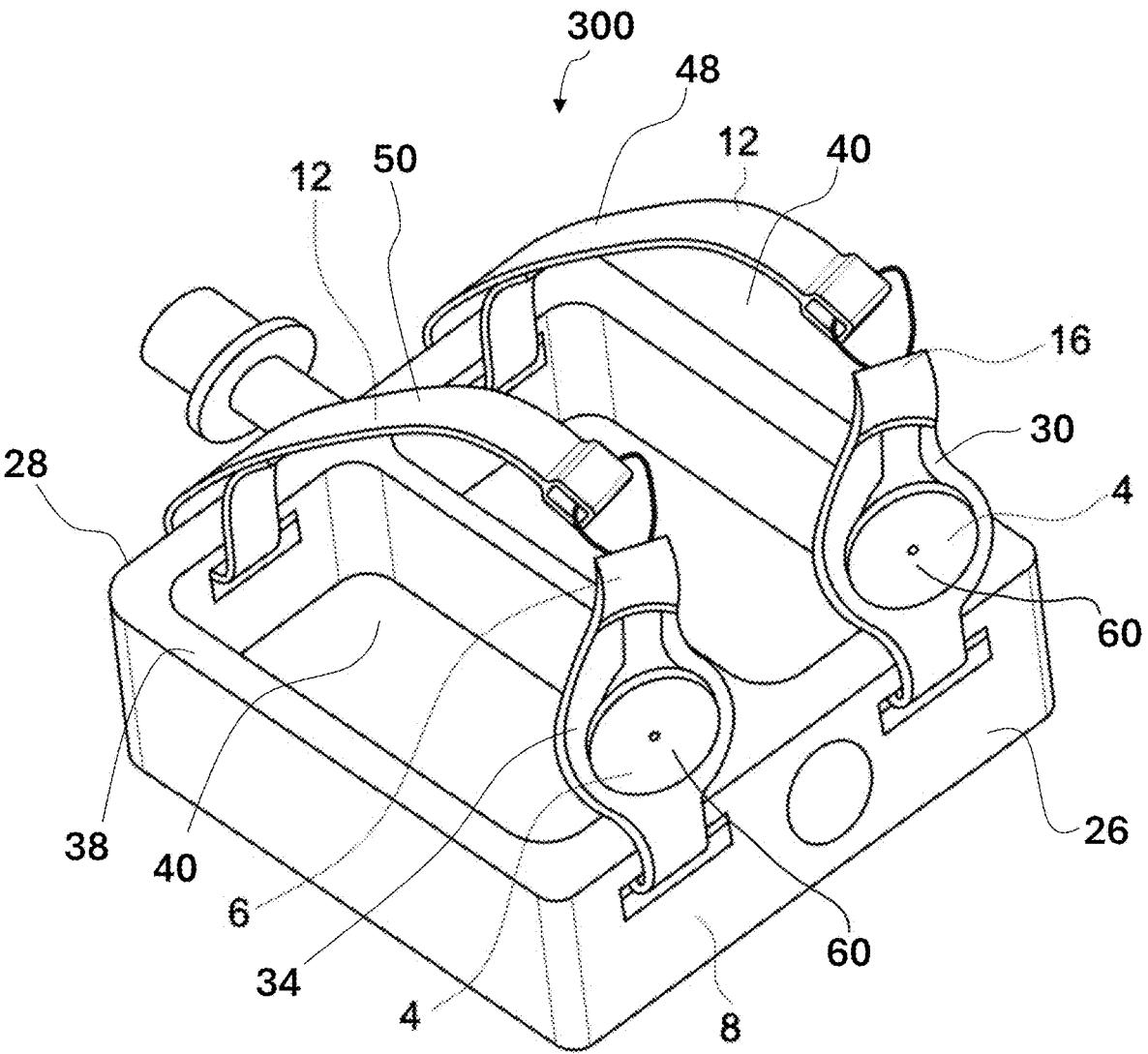
FIG. 3 is a pedal with an adjustment dial system according to another embodiment.

Another embodiment in FIG. 3 shows a pedal system 300 that uses multiple adjustment dials 4 to tighten separate sets of cords 2 attached to the sides of the pedal body 8 and routed over the top of the user's shoe. The dials 4 can be tightened independently to adjust the tightness over different areas of the user's shoe. As shown, the pedal system 300 has a first strap 30 and is secured to a first side 26 of the pedal body 8 and a second strap 32 secured to the second side 28 of the pedal body 8. One cord 2 is attached to and extends between the first and second straps 30, 32. One adjustment dial 4 is attached to one of the first and second straps 30, 32. A third strap 34 secured to the first side 26 of the pedal body 8, and a fourth strap 36 is secured to the second side 28 of the pedal body 8. A second cord 2 extends between the third and fourth straps 34, 36. A second adjustment dial 4 is attached to the third and fourth straps 34, 36.

In the example layout in FIG. 3, multiple adjustment dial systems tighten multiple straps over a pedal body. A first adjustment dial 4 is sewn into the first strap 30 that is attached to first side 26 of the pedal body 8 and the cord 2 is routed from the first adjustment dial 4 through a guide 12, as shown. The cord 2 may also be routed from the first adjustment dial 4 to a hook or guide on the opposite side 28 of the pedal then back over the foot to the adjustment dial 4. Similarly, the guide 12 may be attached to a strap that is attached to the second side 28 of the pedal body 8 and passes over the top of the foot. As shown, a second adjustment dial 4 is sewn into the third strap 34 that is attached to the first side 26 of the pedal body 8 and the cord 2 is routed from the second adjustment dial 4 through a second guide 12, as shown. The strap arrangement may be repeated multiple times at different locations on the pedal body. When the adjustment dial is turned, the cord is reeled into the dial body and the cord is tightened independently in each strap.

Figure 4:
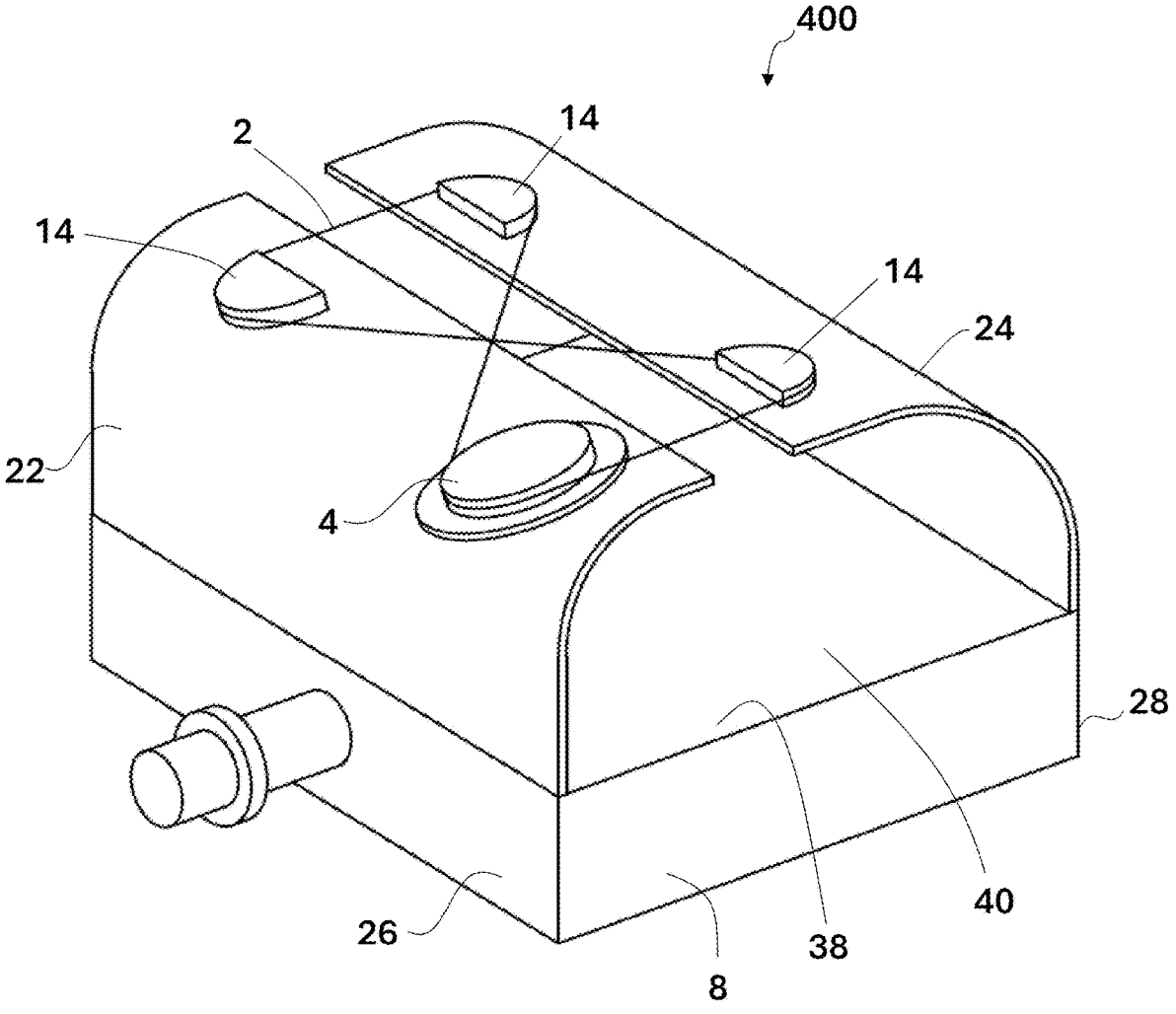
FIG. 4 is a pedal with an adjustment dial system according to another embodiment.

FIG. 4 illustrates a pedal system 400 according to another embodiment having a wide strap 22. The wide strap 22 may be attached to pedal body 8 with various methods. For example, the wide strap 22 may be attached with a fastener or hook and loop attachment, sewn or bonded or other suitable method. The wide strap 22 may also be attached with an interference fit such as a molded pin on the pedal body that engages an aperture on the wide strap 22. The wide strap 22 may be formed of rubber, plastic, leather, natural or synthetic fibers or other suitable flexible material. The wide strap 22 may be pre-formed with a curvature. The curvature may also a user easier access to the adjustable shoe opening.

The wide strap 22 is secured to a first side 26 of the pedal body 8 and a second wide strap 24 is secured to the second side 28 of the pedal body 8. The cord 2 is attached to and extends between the first and second wide straps 22, 24 and the adjustment dial 4 is attached to one of the wide straps 22, 24.

The wide straps 22, 24 provide more contact area to better secure the rider's foot to the pedal body. The cord 2 extends between the first and second straps 22, 24 to allow the straps to be moved apart while a rider inserts their foot and then can be tightened together. The cord 2 may be routed in a crisscross configuration and attached to hooks 14 or guide features on the straps 22, 24. The adjustment dial 4 is attached to one of the straps 22, 24 adjacent a free end. As shown in FIG. 4, the wide straps 22, 24 may have a length generally equal to the length of the pedal body 8. The straps 22, 24 may be less or more than the length of the pedal body 8 while still providing a large contact area to secure the rider's foot to the pedal body. In another embodiment, the wide straps 22, 24 may have a length of at least 50% of the length of the pedal body 8.

Figure 5:
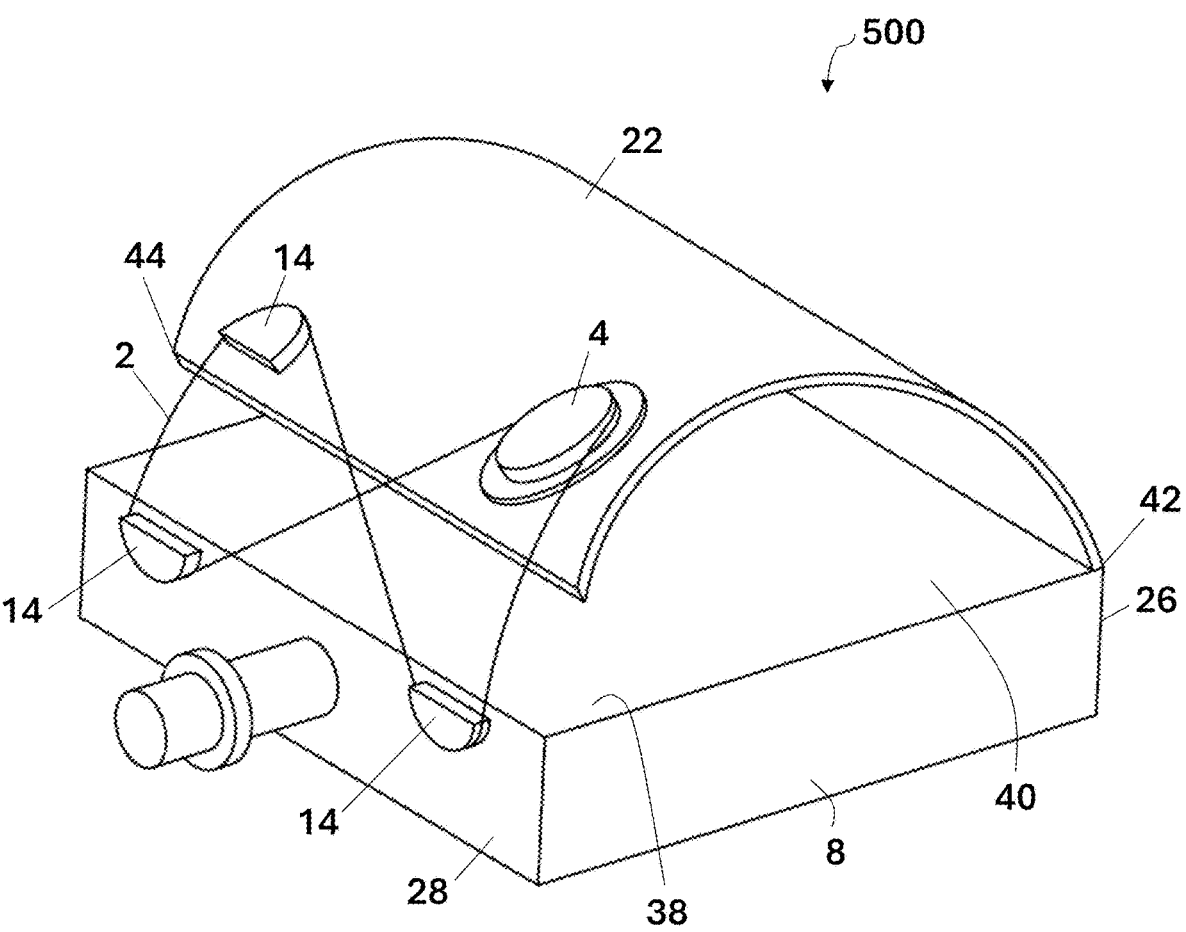
FIG. 5 is a pedal with an adjustment dial system according to another embodiment.

FIG. 5 illustrates a pedal system 500 according to another embodiment having a wide strap 22 attached to pedal body 8 with various methods discussed above. A first end 42 of wide strap 22 is secured to a first side 26 of the pedal body 8. The adjustment dial 4 and cord 2 are secured to a second free end 44 of the wide strap 22. The cord 2 is attached to and extends between the wide straps 22 and the second side 28 of the pedal body.

Figure 6:
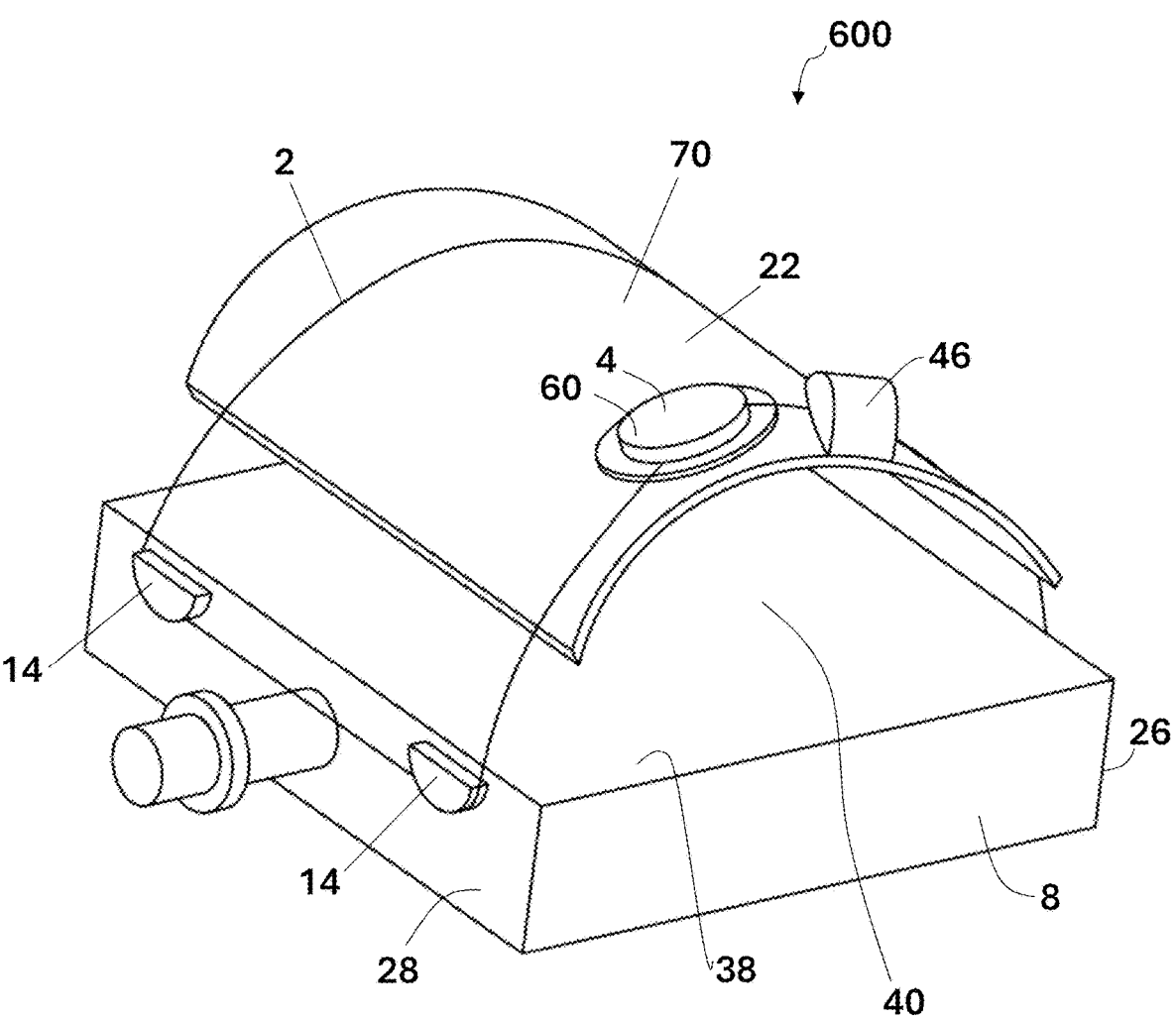
FIG. 6 is a pedal with an adjustment dial system according to another embodiment.
Figure 7:
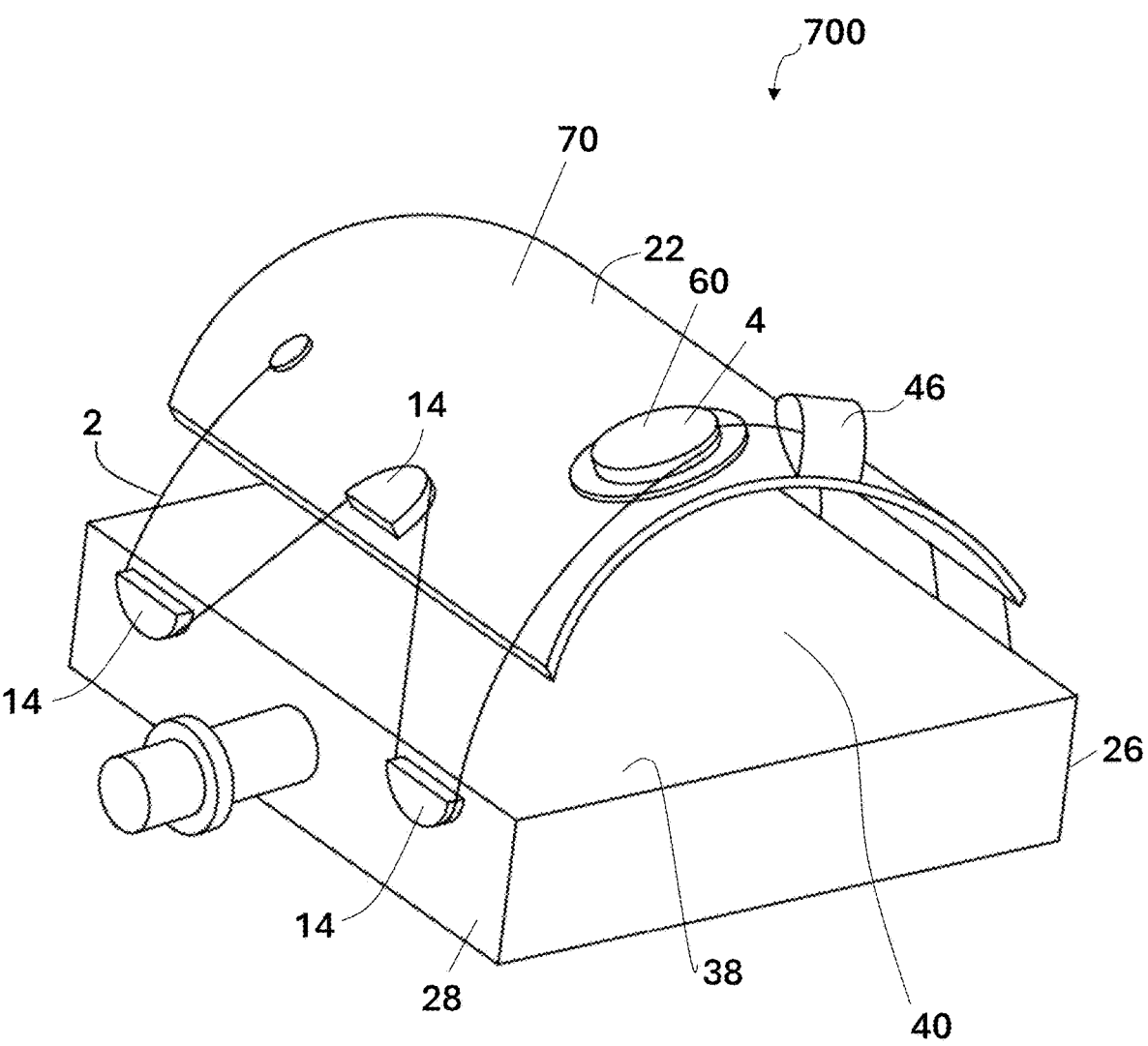
FIG. 7 is a pedal with an adjustment dial system according to another embodiment.

FIGS. 6-7 illustrate pedal systems where a wide strap 22 may not be secured to the pedal body 8 and instead floats above the support surface 38. The cord 2 is attached to pedal body 8 on a first side 26 and a second side 28. The strap 22 is attached to the cord 2 and defines a pressure plate 70 between the first and second sides 26, 28 of the pedal body. As shown in FIG. 6, the pedal system 600 has hooks 14 or guide features on each of the first and second sides 26, 28. The adjustment dial 4 is mouthed on the strap 22 and the cord 2 extends over the strap 22. The strap 22 may include a tongue 46 for the user to grasp the strap 22 as they insert their foot in the opening 40. Having open sides may allow the user to insert their shoe more easily in the opening 40. The wide strap 22 provides good contact and would conform to the top of the user's shoe. FIG. 7 shows a pedal system 700 with additional hooks 14 or guide features defined on the wide strap.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A pedal system comprising:
   a pedal body being generally rectangular and having a generally planar support surface;
   at least one strap connected to the pedal body, wherein an opening is defined between the support surface and the at least one strap and configured to receive a rider's foot;
   an adjustment dial configured to be manually rotated by a rider and secured to at least one of the strap or pedal body;
   a cord operatively connected to the adjustment dial and connected to the strap, wherein rotation of the adjustment dial varies a length of the cord and a position of the strap, and thereby adjusts a size of the opening formed between the pedal body and the strap and for adjustably securing the rider's foot to the pedal body, wherein the strap is secured to the pedal body on a first side and the cord is attached to the pedal body on a second side.

2. The pedal system of claim 1, wherein the pedal body has a guide hook on the second side and the cord is attached to the guide hooks.

3. The pedal system of claim 1, wherein the strap includes a forward strap and an aft strap, wherein the cord extends through guides on the forward and aft strap and the cord is attached to the pedal body at a forward hook and an aft guide hook.

4. The pedal system of claim 1, wherein the pedal body has two guide hooks on the second side and the strap has at least one guide hook, wherein the cord is attached to the guide hooks.

5. The pedal system of claim 1, wherein a first strap is secured to a first side of the pedal body and a second strap is secured to the second side of the pedal body, wherein the cord is attached to and extends between the first and second straps, wherein the adjustment dial is attached to one of the first and second straps.

6. The pedal system of claim 1, wherein the adjustment dial comprises a ratchet dial.

7. The pedal system of claim 1, wherein the at least one strap comprises first and second straps formed of a material preformed with a curvature to form the opening.

8. The pedal system of claim 5, further comprising:
   a third strap secured to the first side of the pedal body, and a fourth strap is secured to the second side of the pedal body;
   a second cord extends between the third and fourth straps; and
   a second adjustment dial is attached to the third and fourth straps.

9. The pedal system of claim 1, wherein the at least one strap is fixed to the pedal body at a first end and the cord extends from a second end of the strap and is connected to a guide feature.

10. The pedal system of claim 6, wherein the ratchet dial rotates to reel the cord into the ratchet dial in one way and prevents the cord from reeling out of the ratchet dial until a release mechanism in the dial is actuated.

11. The pedal system of claim 1, wherein at least one of the strap or cord is attached to a first side and a second side of the pedal body, and wherein and the strap extends a vertical distance above the pedal body, wherein adjusting the opening adjusts the vertical distance of the strap for adjustably securing a rider's foot to the pedal body.

12. A pedal system comprising:

a pedal body being generally rectangular and having a generally planar support surface;

at least one strap connected to the pedal body, wherein an opening is defined between the support surface and the at least one strap and is configured to receive a rider's foot;

an adjustment dial configured to be manually rotated by a rider and secured to at least one of the strap or pedal body;

a cord operatively connected to the adjustment dial and connected to the strap, wherein rotation of the adjustment dial varies a length of the cord and a position of the strap, and thereby adjusts a size of the opening formed between the pedal body and the strap and for adjustably securing the rider's foot to the pedal body, wherein the cord is attached to the pedal body on a first side and a second side, wherein the strap is attached to the cord and defines a pressure plate between the first and second sides of the pedal body.

13. The pedal system of claim 12, wherein the adjustment dial comprises comprising:

a ratchet dial configured to be manually rotated by the rider.

14. A pedal system comprising:

a pedal body having a generally planar support surface for supporting a rider's foot;

a dial-adjustment system comprising:

at least one strap attached to the pedal body at a first end;

a ratchet dial secured to the strap, the ratchet dial configured to be manually rotated by the rider;

a cord connected to the ratchet dial to form a loop, wherein the cord extends from a second free end of the strap and cooperates with a guide feature on the pedal body or a strap;

an opening defined between the support surface of the pedal body, the strap and the cord, wherein rotation of the ratchet dial varies a length of the cord, and thereby adjusts a size of the opening for adjustably securing the rider's foot to the pedal body.

15. The pedal system of claim 14 wherein the pedal body comprises a generally rectangular platform.

16. The pedal system of claim 14, wherein the strap is secured to the pedal body on a first side and the pedal body has at least one guide hook on a second side and the cord is attached to the guide hook.

17. The pedal system of claim 14 wherein the strap is formed of a material preformed with a curvature to form the opening.

18. The pedal system of claim 14, wherein a first strap is secured to a first side of the pedal body and a second strap is secured to the second side of the pedal body, wherein the cord is attached to and extends between the first and second straps, wherein the ratchet dial is attached to one of the first and second straps.

19. The pedal system of claim 14, wherein at least one of the strap or cord is attached to a first side and a second side of the pedal body, and wherein and the strap extends a vertical distance above the pedal body, wherein adjusting the opening adjusts the vertical distance of the strap for adjustably securing a rider's foot to the pedal body.

* * * * *